United States Patent Office 3,371,056
Patented Feb. 27, 1968

3,371,056
THIXOTROPIC MIXTURES CAPABLE OF BEING HARDENED RESULTING IN THE FORMATION OF SYNTHETIC MATERIALS
Hermann Delius, Ahrensburg, Holstein, Germany, assignor to Reichhold Chemicals, Inc., White Plains, N.Y.
No Drawing. Continuation-in-part of application Ser. No. 56,117, Sept. 15, 1960. This application May 13, 1965, Ser. No. 455,592
Claims priority, application Germany, May 29, 1964, R 38,004
16 Claims. (Cl. 260—22)

ABSTRACT OF THE DISCLOSURE

A hardenable thixotropic mixture suitable for use as a lacquer comprising (A) a modified polyester which is a reaction product of (1) an unsaturated polyester resin containing free hydroxyl groups having a hydroxyl number between 10 and 300 and an acid number between 10 and 40 with (2) a preformed product having predominantly a free isocyanate group resulting from the heat reaction of a polyisocyanate and a monohydroxyl compound in stoichiometric proportions in admixture with (B) a copolymerizable solvent for (A) comprising at least one member of a group consisting of vinyl and allyl compounds, and (C) at least one polymerization inhibitor, the proportion of components (1) and (2) being such that no free isocyanate groups remain in the reaction product, component (1) being in liquid form and component (2) being freshly prepared when reacted with component (1).

The present application is a continuation-in-part of my earlier application Ser. No. 56,117, filed Sept. 15, 1960, now Patent No. 3,227,778, dated Jan. 4, 1966, claiming priority as of Mar. 30, 1960, on the basis of German application RF 27,664, filed Mar. 30, 1960, now German Patent No. 1,117,306, dated may 24, 1962.

The present invention relates to thixotropic mixtures capable of being hardened resulting in the formation of synthetic materials, particularly for use as solvent-free lacquers, having as a basic unsaturated polyesters and monomeric polymerizable ethylene compounds, if necessary by incorporating therein the usual catalysts, accelerators and inhibitors, which are characterized in that they contain novel unsaturated polyesters in the form of reaction products obtained from hydroxyl groups-containing unsaturated polyester resins and reaction products of polyisocyanates and monohydroxyl compounds having preponderantly a free isocyanate group.

The novel unsaturated polyesters contained in the hardenable thixotropic mixtures in accordance with the present invention are obtained by (a) Reacting hydroxyl groups-containing unsaturated polyester resins with reaction products of polyisocyanates and monohydroxyl compounds having preponderantly a free isocyanate group by mixing, if necessary in the presence of slvents and if necessary by heating, and (b) Mixing the thus modified polyester with monomeric polymerizable vinyl and/or allyl compounds and inhibitors.

A variation of the process for the preparation of the new modified unsaturated polyesters consists in reacting the hydroxyl groups-containing unsaturated polyester resins with reaction products of polyisocyanates and monohydroxyl compounds having preponderantly a free isocyanate group, in solutions of monomeric polymerizable vinyl and/or allyl compounds, by mixing and if necessary by heating.

With regard to the hydroxyl groups-containing unsaturated polyester resins, these are understood to include condensation products that are obtained from $\alpha,\beta$-unsaturated dicarboxylic acids and/or their anhydrides and an excess of polyvalent alcohols by polycondensation. The $\alpha,\beta$-unsaturated dicarboxylic acids which are operable include for example: maleic acid, maleic acid anhydride, fumaric acid, itaconic acid, citraconic acid, mesaconic acid and aconitic acid as well as halogenated acids, such as chloromaleic acid.

A part of the $\alpha,\beta$-unsaturated dicarboxylic acids may be replaced, in known manner, with saturated dicarboxylic acids, such as o- and isophthalic acid, tetra- and hexahydrophthalic acid, tetrachlorophthalic acid, hexachloroendomethylenetetrahydrophthalic acid, adipic acid and sebacic acid as well as dimerized linseed oil and soybean oil fatty acids or their anhydrides.

The polyvalent alcohols employed are preferably divalent alcohols, such as ethylene glocol; propanediol-1,2, butanediol-1,3, diethylene glycol; dipropylene glycol and their higher homologues neopentyl glycol, 2,2,4-trimethylpentanediol-1,3, oxalkylated bis-phenols, hydrogenated bis-phenol and dimethylolcyclohexane. However, it is also possible to use, together with these, tri- and multivalent alcohols, such as glycerin, trimethylolethane, trimethylolpropane as well as pentaerythrite in the practice of this invention.

If the air-drying properties of the polyesters are of particular value, it is necessary to replace the polyvalent alcohols, at least in part, with $\beta,\gamma$-unsaturated ether alcohols. Examples of such compounds which are operable include: the monoallyl and monomethallyl ethers of ethylene glycol, propanediol-1,2, butanediol-1,3, and -1,4, of glycerine, trimethylolpropane and ethane and of pentaerythrite as well as the diallyl ethers and the corresponding methallyl ethers of glycerine and pentaerythrite. Particularly useful in this connection are the $\beta,\gamma$-unsaturated ether alcohols that contain at least two $\beta,\gamma$-unsaturated ether groups, such as trimethylolpropanediallyl ether, trimethylolethanediallyl ether and pentaerythritetriallyl ether.

It is possible to further modify the properties of hydroxyl groups-containing unsaturated polyester resins by the addition of monofunctional compounds during the polycondensation, for example by the addition of fatty acids having 8 to 22 carbon atoms such as benzoic acid, resinic acids; partially hydrogenated resinic acid, such as abietic acid and/or dihydro-or tetrahydroabietic acid; monovalent n- or isoalcohols having 4 to 12 carbon atoms; benzyl alcohol; resin alcohol, as for example abietyl alcohol.

The reacted hydroxyl groups containing polyester resins contained in the hardenable thixotropic mixtures must have, before the reaction, at least a hydroxyl number (determined by the acetylation method with acetic acid anhydride-pyridine of A. Verley and F. Bäsig, Ber. 34, 3354–58, 1901) between 10 and 300, preferably from 20 to 100, and an acid number from 10 to 40, preferably smaller than 30. Moreover, the polyester resins must be soluble in monomeric polymerized vinyl and/or allyl compounds.

The reaction products of polyisocyanates and monohydroxyl compounds having preponderantly a free isocyanate group that are useful in the practice of this invention are those obtained by reacting (1) polyisocyanates such as aromatic polyisocyanates and, more particularly, 1,2,4- or 1,2,6-toluylenediisocyanate, 4,4'-diphenylmethanediisocyanate, diphenyldimethylmethane - 4,4'-diisocyanate, naphthylene - 1,5-diisocyanate, triphenylmethane-4,4',4''-triisocyanate, polymethylenepolyphenylisocyanate, cycloaliphatics, such as cyclohexane-1,4-diisocyanates, aliphatics, such as tetramethylene-1,4-diisocyanate and hexamethylene-1,6-diisocyanate, with (2) alcoholic monohydroxyl compounds, such as saturated and/or unsaturated monoalcohols, monohydroxy-carboxylic acid esters, esters of polyols, partial esters of polyols, such as straight-chained and branch-chained saturated and unsaturated monoalcohols of aliphatic, cycloaliphatic, aromatic, aryl-aliphatic and heterocyclic nature having up to 20 carbon atoms, as well as their substitution products with halogen, nitro groups and the like. Specific examples are: methanol, ethanol, propanol, n-butanol, iso-butanol, sec. butanol, 2-methyl-1-pentanol, 2-methylpentanol-3, prim. and sec. octanol, 2-ethylhexanol, n-nonanol, n-dodecanol, 6-dodecanol, lauryl, myristyl and stearyl alcohols, 2-chloro-1-propanol, 3-bromo-1-propanol, 2,2-dichloro-1-propanol, 2-nitro-1-propanol, 1-chloro-2-propanol, 2-nitro-1-butanol, abietyl alcohol, tetrahydroabiethyl alcohol and furfuryl alcohol.

The preferred monoalcohols are compounds that contain primary alcoholic hydroxyl groups; the reason for this is the fact that these are particularly reactive with isocyanates. However, the monoalcohols with secondary and tertiary alcoholic hydroxyl groups are also useful. Moreover, there may be employed besides saturated alcohols, also unsaturated alcohols. These have the advantage of having double bonds that are capable of causing further cross-linking during the copolymerization of the thixotropic unsaturated polyesters. Specific examples of such alcohols are: β, γ-unsaturated alkenols, such as allyl alcohols, methallyl alcohol, ethallyl alcohol, chloroallyl alcohols, crotyl alcohol, phenylallyl alcohol, methylvinyl carbinol as well as unsaturated fatty alcohols that are obtained by selective hydrogenation of unsaturated fatty acids.

As the alcoholic monohydroxyl compounds it is possible to use also partially etherified polyalcohols. In that case, both components, i.e., the monoalcohol and polyalcohol radicals, may contain saturated or unsaturated C—C linkages. The monoalcohol radical may be, in addition to this, of aromatic, cycloaliphatic or heterocyclic nature. Specific examples are: the monomethyl, monoethyl, mono-n-propyl, monoisopropyl mono-n and mono-isobutyl, monoallyl, monomethallyl, monoethallyl, monochloroallyl, monocrotyl, monophenyl, monobenzyl and monofurfuryl ethers of ethylene glycol, the corresponding diethers of glycerine, trimethylolethane and propane and the analogous triethers of pentaerythrite. Moreover, it is possible to use hydroxycarboxylic acids or their esters, such as ricinoleic acid, ricinoleic acid methyl and ethyl ester, hydroxycitric acid esters of methyl, ethyl and isobutyl alcohol, lactic acid esters as well as malic and tartaric acid esters that still have one free hydroxyl group.

The reaction of the hydroxyl groups-containing unsaturated polyester resins takes place in liquid or dissolved or melted condition. The reaction products of polyisocyanates and monohydroxyl compounds, in order to obtain the best results, are applied at once as freshly prepared intermediate products. The intermediate products have a varying degree of reactivity, the latter being determined particularly by the starting isocyanate and not so much by the starting monohydroxy compound. In the preparation of the intermediate products, the reactants are applied in stoichiometric proportions so that the resulting reaction (intermediate) products contains a free isocyanate group. The reaction of the polyester resin with the intermediate product takes place by mixing either at room temperature or by applying heat. In this case, the proportions of the hydroxyl groups containing unsaturated polyester resin and the intermediate product with a free isocyanate group, are adjusted in such a way that the reaction product, upon completing the reaction still contains free hydroxyl groups or, in other words, the final reaction product must not contain free isocyanate groups. By reacting equivalent quantities of reactants it is possible to obtain also reaction products that have no free hydroxyl groups and no free isocyanate groups. The reaction can be accelerated by the use of catalysts, such as tertiary amines and/or metal soaps, naphthenates, octoates and the like. Examples of tertiary amines are morpholine, triethylene diamine. Suitable metal soaps are the octoates or naphthenates, zinc and lead. The reaction temperatures, when operating in a melt, are from about 90° to 120° C. The best results are obtained by operating in an inert gas atmosphere. However, it is preferred to carry out the reaction in a solution. Of particular value in this connection is the use of copolymerizable vinyl and allyl compounds as solvent materials. It is unimportant whether the reaction is carried out in the presence or absence of air. The reaction in solution can take place within a few days at room temperature or within a few hours at temperatures from about 30° to 70° C., preferably from 50° to 60° C.

Specific examples of copolymerizable vinyl compounds are: styrene, vinyl toluene, divinyl benzene, acrylic acid ester, methacrylic acid ester, methylacrylate, ethylacrylate, n-butylacrylate, 2-ethylhexylacrylate, methylmethacrylate, ethyleneglycol dimethacrylate and its higher homologues, such as diethyleneglycol dimethacrylate and triethyleneglycol dimethacrylate. Suitable allyl compounds are: diallylphthalate, diallylmaleinate, diallylfumarate, triallylcyanurate, vinyl acetate and vinyl propionate.

The new modified unsaturated polyester resins are distinguished by thixotropic properties in dissolved condition. Therefore, these polyester resin solutions, when they are applied as varnishes or the like, have the ability to withstand the tendency of downward flowing as may occur in various applications, particularly on vertical walls. The hitherto known polyester resin solutions contained finely dispersed silica to prevent downward flowing on vertical walls. While this is satisfactory in some respects, it has the drawback that the silica addition provides coatings having insufficient gloss, i.e., the appearance of the coatings and the like is more or less dull. On the other hand, by the use of the hardenable thixotropic mixtures of the present invention it is possible to obtain films of great transparency and high gloss. Moreover, the products of the present invention, aside from the above-mentioned property of not flowing on vertical walls, especially during the hardening period, display in their hardened condition a greatly increased alkali and water resistance as compared to conventional fully hardened unsaturated polyester resins.

If it is found that insufficient quantities of a polymerization inhibitor has been added in the preparation of the polyesters, i.e., hydroquinone, quinone or tert-butyl pyrocatechol, it is possible to suitably stir small quantities of such substances into the melt of the polyester thereby improving the storage stability of the polyesters after they have been mixed with polymerizable ethylene derivatives and at the same time permitting a control of the speed required for hardening the mixtures. The mixtures catalyzed in the usual manner under go complete hardening. Suitable catalysts for this purpose are the peroxides that generate free radicals in the presence of metal compounds, particularly cobalt compounds, as for example the combination of ethylmethylketone peroxide, methylisobutyl - ketone peroxide, cyclohexanone peroxide, cumene hydroperoxide, pinane hydroperoxide or 1,2,3,4-tetrahydronaphthalene - 1 - hydroperoxide with cobalt naphthenate. However, other catalyst systems that generate free radicals at room temperature, for example the combination of tert. aromatic amines and acyl peroxides, such as benzoyl peroxide or 2,4-dichlorobenzoyl peroxide, are also useful.

Inasmuch as the mixtures according to the present invention undergo hardening at raised temperatures, the addition of accelerators may be dispensed with. The following peroxides are preferred for the heat-hardening step: benzoyl peroxide, p-tert.-butyl perbenzoate, di-tert.-butyl peroxide, tert.-butyl peroctoate and mono-tert.-buytl permaleiate.

Aside from their use as raw materials for lacquers and varnishes, the mixtures according to the present invention are generally suitable in all cases wherein the thixotropic properties facilitate the application of the products or the safe handling thereof, for example as casting or caulking masses, as adhesives and impregnating agents, as a binder for glass fiber products.

The mixtures according to the present invention may contain, in addition to the new modified polyesters, also other copolymerizable resins, as for example other unsaturated polyester resins.

*Example 1*

(a) 1430 g. butanediol-1,3; 400 g. propanediol-1,2; 1400 g. maleic acid anhydride; and 700 g. phthalic acid anhydride are heated at 200° C. within 5 hours, while being stirred and exposed to a current of $CO_2$. This temperature is maintained until a 70% solution of the reaction product in styrene has a viscosity of 800 cp. and an acid number of 18. At this point, upon cooling the solution to 110° C., there are added 500 g. hydroquinone and the resin is mixed with styrene in a proportion of 70:30. The product has a hydroxyl number of 40.

(b) To a quantity of 176 g. toluylenediisocyanate consisting of 65% 2,4-isomer and 35% 2,6-isomer, there was added in small portions and at a temperature between 50 and 60° C. 58 g. allyl alcohol. After completing the addition and dissipating the heat of reaction, the temperature was held at 70° C. for one hour.

(c) 100 g. of the 70% solution obtained according to 1a were mixed at room temperature with 6 g. of the product obtained according to, 1b whereupon the mixture is heated for 5 hours at 50–60° C. in a drying chamber. After cooling, the clear product displayed considerable thixotropy, i.e., it appeared in the form of a stiff gel which, however, became thinly liquid upon stirring. As soon as the stirring is stopped, the product solidified again.

(d) To prepare a polyester lacquer, 80 parts by weight of the product obtained according to Example 1c were diluted with 30 parts by weight of styrene and 5 parts by weight of butyl acetate. The resulting solution was then mixed with 0.5 part by weight cobalt octoate solution (6% metal content)
0.5 part by weight parffin solution (5% in styrene)
0.3 part by weight silicone oil (1% in toluene)
5.0 parts by weight methylethylketone peroxide (40% in a plasticizer)

and further diluted with acetone until the lacquer had a spraying viscosity of 20–22 DIN″. The polyester lacquer was sprayed on plywood panels placed in vertical position. It was possible to apply a layer having a thickness of 250 to 300μ without any running off of the lacquer film. After a hardening period of 6–8 hours, the hardened polyester lacquer film was sanded in the usual way and, if necessary, polished to produce a high gloss.

*Example 2*

(a) It was possible to arrive at a product having the same properties, by reacting 70 parts of the polyester according to Example 1a, before it is extended with styrene, with 6.2 parts of the product obtained according to Example 1c, at about 110 to 120° C., under a $CO_2$ atmosphere, for 30–40 minutes and then blending the resulting reaction product with 30 parts of styrene.

(b) By using a polyester resin prepared in accordance with Example 2a, it is possible to obtain in accordance with Example 1d a polyester lacquer for wooden objects that harden at room-temperature and which can be applied in the same way. The resulting lacquer films are distinguished by their outstanding gloss and filling capacity.

*Example 3*

(a) A crystalline product is obtained by reacting at room temperature equimolar quantities of toluylenediisocyanate having a content of 65% 2,4-isomer and 35% 2,6-isomer and methyl alcohol.

(b) 7.75 g. of the reaction product prepared according to Example 3a are dissolved in 150 g. of the polyester solution of 70% concentration obtained in accordance with Example 1a. This mixture is again reacted for 5 hours at 50° C. yielding, upon cooling, a clear thixotropic polyester resin that was capable of being hardened at room temperature or by applying heat with the aid of the usual peroxides and accelerators.

(c) 5 kg. of the resulting product were mixed with 2% benzoyl peroxide paste (50% in a plasticizer) and additional 5 kg. with 0.2% dimethylaniline. These solutions were poured into the reservoirs of a so-called fiber-spraying device provided with stirrers. Such a device permits spraying, in one operation, chopped glass fibers with polyester resin, whereby the resin mixed with peroxide and the resin mixed with accelerator are put together only in the spray jet. After treating a stack of vertically arranged concrete plates, it was found that this could be subjected to compressive rolling without any tendency of the resin to flow out of the laminate. When a conventional polyester resin is used, it is not possible to avoid this type of flowing, particularly at the points where there is excess of resin, and the resulting formation of air pockets or voids.

*Example 4 to Example 7*

In each case 1 mole of toluylenediisocyanate having the same composition mentioned in Examples 1b and 3a was reacted with 1 mole of the following monohydroxyl compounds:

Example 4a: n-butanol
Example 5a: iso-butanol
Example 6a: ethyleneglycolmonoethyl ether
Example 7a: 1-ethyl-hexanol.

In each case, 150 g. of the 70% unsaturated polyester resin obtained according to Example 1a were mixed with 10 g. of the reaction product of Examples 4a and 5a, 10.5 g. of the reaction product of Example 6a and 12.1 g. of the reaction product of Example 7a and heated at 50 to 60° C. for 5–6 hours. The reactions were carried out first in the presence of air and then, after closing the reaction vessel, in the absence of air. In each case, it was possible to obtain highly thixotropic clear polyester resin solutions.

Polyester spraying lacquers for wood were prepared, based upon the formulation given in Example 1d. In each case, after application to vertically disposed wood panels, there was no tendency of running off or of separation of the paraffin component.

*Example 8*

(a) 485 g. propanediol-1,2, 321 g. trimethylolpropanediallyl ether, 40 g. trimethylolpropane, 234 g. adipic acid, and 528 g. phthalic acid anhydride were heated at 180° C. for 5 hours upon addition of 350 mg. hydroquinone while stirring the whole in a 2-1-flask under a protective atmosphere of $CO_2$. In order to avoid losses of alcohols that are present in excess quantities it is recommended to place, between the flask and the water separator, a 30 cm. tall column filled with Raschig rings. The temperature of 180° C. was maintained until the product displayed an acid number of 70. At this point, the temperature was allowed to drop to about 160° C. and there were added 200 gr. maleic acid anhydride.

After dissipating the positive heat of reaction, the heating was resumed and the temperature maintained between 180 and 190° C. until a 67% solution of the product in styrene had a viscosity of L-M according to Gardner-Holdt and an acid number of 40. The esterification is then accelerated by occasional application of a vacuum. After the acid number of the 67% styrene solution had dropped to 25 and the viscosity of an identical solution had increased to a value of S-T according to Gardner-Holdt, the product was allowed to cool off; it was then mixed with styrene at a temperature of 105° C. in a ratio of 67:33. The hydroxyl number of the solution was 44.

(b) 84.0 g. hexamethylenediisocyanate-1,6 and 0.3 g. zinc naphthenate (12% Zn) were heated to 50° C. whereupon 16.0 g. methanol were added in small portions. After dissipating the slightly positive heat of reaction, the mixture was again heated to 80° C. and maintained at this temperature for 1 hour. The product crystallized out upon cooling.

(c) 27 g. of the product obtained in accordance with Example 8b were added to 500 g. of the 67% solution of polyester in styrene obtained in accordance with Example 8a and then stirred together until there was formed a homogeneous solution. This was allowed to stand for 5-6 hours at 50° C. The clear product obtained upon cooling was of average thixotropy.

(d) 100 g. of the product obtained in accordance with Example 8 was mixed with 15 g. of a 52% butanol solution of a commercial melamine-formaldedyde resin etherified with butanol 2 g. tert.-butylperoctoate (90%), 0.3 ml. cobaltoctoate solution (1% metal content), and 5 g. butyl acetate. This mixture was further diluted with styrene until there was obtained a spraying viscosity of 20-22 DN". It was then sprayed upon vertically disposed metal sheets to a layer thickness of about 100μ. After an airing period of about 15-20', the sheets were baked for 30 minutes at 140° C. The resulting lacquer films possessed a high gloss and filling capacity. The films were so tenaciously flexible and adhering that even bending of the sheets to 180° could not break them loose.

A polyester lacquer for metals prepared in accordance with this example can be ground with the usual pigments and, if necessary, with fillers to produce either lacquers of high luster applied in the form of single layers or prime coatings of superior filling capacity or caulking compounds applied by spraying.

*Example 9*

(a) 100 g. of an unsaturated polyester resin consisting of a mixture of 70 parts of polyester (prepared from maleic acid anhydride, phthalic acid anhydride and propanediol-1,2 in a mole ratio of 1:1:2.05) and 30 parts of styrene, stabilized with 0.015% hydroquinone, and having a viscosity of 800 cp. at 20° C., an acid number of 28 and a hydroxyl number of 25, were mixed with 3 g. of the reaction product prepared in accordance with Example 1b and thereafter placed in a drying chamber for a period of 6 hours at 55° C. A slightly cloudy thixotropic polyester resin was obtained upon cooling.

(b) 100 parts of the resulting thixotropic polyester resin were diluted with additional 10 parts of styrene whereupon 10 parts of titanium dioxide (brand name Kronos RN 56) were stirred into the mixture. The white color paste was homogenized by grinding it twice in a funnel mill. At this point there are added 3 parts of methylethylketone peroxide and 0.5 part of a cobaltoctoate solution (1% metal content). A boat form provided with separating means was coated with a single layer of this white mass. There was no noticeable running off of the layer which, after hardening, possessed a uniform thickness.

*Example 10*

(a) 100 parts of an unsaturated polyester having a viscosity of 370 cp. at 20° C. and an acid number of 12, and consisting of: 30 parts styrene and 70 parts of a polyester obtained from 1 mole maleic acid anhydride, 1 mole adipic acid, 2.5 moles phthalic acid anhydride, and 4.85 moles diethylene glyol stabilized with 0.0025% hydroquinone were mixed with 7 g. of a reaction product prepared in accordance with Example 6a, from 1 mol toluyl- enediisocyanate and 1 mol ethyleneglycolmonoethyl ether. After allowing the mixture to stand for 5 hours at a temperature of 50° C., the product displayed a high degree of thixotropy.

(b) A body patching compound was prepared by mixing the following components in a kneader: 90 parts by weight of the thixotropic polyester resin prepared according to Example 10a, 10 parts by weight styrene, 50 parts by weight talcum, 50 parts by weight chalk, 0.6 part by weight cobaltoctoate solution (6% metal content).

The application was carried out by mixing 100 parts by weight of the body patching compound with 1 part by weight of methylethylketone peroxide (in 40% plasticizer), vigorously stirring and then coating sheet metal for automobile bodies having recesses and the like irregularities which were placed in vertical position. The polyester used for the preparation of the body patching compound is so highly thixotropic that after a 30% reduction of the filler content there was no noticeable running out from the recesses of the sheet metal. The hardened body patching compound applied to the sheet metal was extremely tough, so that it did not break loose even after impact produced by a hammer on the back side of the sheet.

*Example 11*

(a) 250 g. 4,4' - diphenylmethanediisocyanate were fused and added slowly drop by drop, while slightly cooling, at a temperature between 70 and 80° C., to 90 g. ethyleneglycolmonoethylether. After completing the addition, the temperature was kept at 80° C. for one more hour. Since the product thus prepared, which still contains a free isocyanate group, crystallizes out at room temperature in the form of a solid mass, it was dissolved by the addition of equal amounts of styrene which facilitated mixing it with the unsaturated polyester resin.

(b) 100 parts of the 70% solution of the unsaturated polyester in styrene, prepared in accordance with Example 1a was mixed with 9.0 parts of the still warm 50% solution of the reaction product obtained in accordance with Example 11a, whereupon the mixture was allowed to stand at 60° C. for 10 hours. After cooling to room temperature, the modified polyester resin was found to have pronounced thixotropic properties.

(c) As indicated in Example 9b, this resin can be used for the production and elaboration of white pigmented resin films. Also in this case, there was no running of the freshly applied product and no noticeable drop formation, the films being consistently of uniform thickness.

The reactions that take place during the preparation of the new modified polyester resins contained in the thixotropic mixtures, as well as the resulting reaction products, can be summarized as follows: The reaction of hydroxyl groups-containing unsaturated polyester resins having a terminal hydroxyl group and a terminal carboxyl group

or the reaction of hydroxyl groups-containing unsaturated polyester resins having two terminal hydroxyl groups

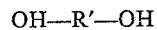

wherein R and R' represent radicals of the unsaturated polyester resins derived from α,β-unsaturated dicarboxylic acids and polyalcohols, if necessary with the use in conjunction therewith of saturated aliphatic and/or aromatic dicarboxylic acids and partial allyl ethers of polyalcohols, with reaction products containing preponderantly an isocyanate group having the general formula

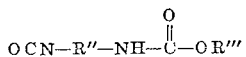

obtained from polyisocyanates and monohydroxyl compounds, wherein R" represents the following organic radicals: toluyl-1,4 and -1,6,4,4'-diphenylylmethane, 1,5- naphthyl-, 1,6-cyclohexyl-, tetramethyl-, hexamethyl- and

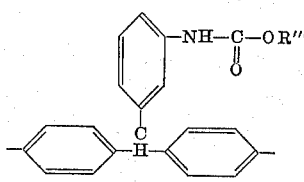

wherein R''' represents the monohydroxyl compounds mentioned in col. 2, line 72 to col. 3, line 50, of the specification, upon carrying out the reaction with molar proportions, will result in the formation of modified polyester resins corresponding to the following formula:

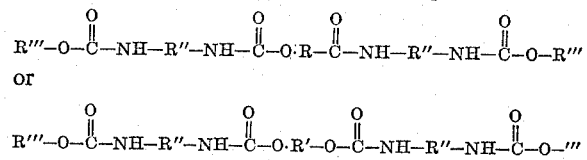

By carrying out the preferred reaction of hydroxyl groups-containing unsaturated polyester resins with a deficiency of intermediate products that still contain a free isocyanate group, it is possible to obtain modified unsaturated polyester resins still having free hydroxyl or free carboxyl groups.

I claim:

1. A hardenable thixotropic mixture suitable for use as a lacquer comprising (A) a modified polyester which is a reaction product of (1) an unsaturated polyester resin containing free hydroxyl groups having a hydroxyl number between 10 and 300 and an acid number between 10 and 40 with (2) a preformed product having predominantly a free isocyanate group resulting from the heat reaction of a di-isocyanate and a monohydroxyl compound in stoichiometric proportions in admixture with (B) a copolymerizable solvent for (A) comprising at least one member of a group consisting of vinyl and allyl compounds, and (C) at least one polymerization inhibitor, the proportion of components (1) and (2) being such that no free isocyanate groups remain in the reaction product, component (1) being in liquid form and component (2) being freshly prepared when reacted with component (1).

2. The mixture defined in claim 1 wherein the unsaturated resin containing hydroxyl groups is formed by polycondensation reaction of (1) at least one α,β unsaturated dicarboxyl acid or anhydride and (2) an excess of a polyvalent alcohol.

3. The mixture as set forth in claim 2 wherein component (1) is replaced in part by a saturated dicarboxylic acid.

4. The mixture as set forth in claim 2 wherein component (2) is a divalent alcohol.

5. The mixture as set forth in claim 2 wherein component (2) is replaced in part by a β,γ unsaturated ether alcohol.

6. The mixture as set forth in claim 2 wherein in addition to components (1) and (2) a fatty acid having 8 to 22 carbon atoms is included in the polycondensation reaction.

7. The mixture defined in claim 2 wherein the polycondensation reaction takes place in liquid, dissolved or melted condition.

8. The mixture as defined in claim 1 wherein the product having predominantly free isocyanate groups comprises the reaction product of (1) an aromatic di-isocyanate with (2) an alcoholic monohydroxyl compound.

9. The reaction mixture as defined in claim 8 wherein component (2) is a compound containing a primary alcoholic hydroxyl group.

10. The reaction mixture as defined in claim 8 wherein component (2) includes both saturated and unsaturated alcohols.

11. The reaction product as defined in claim 8 wherein component (2) includes a partially etherified polyalcohol.

12. The reaction product as defined in claim 8 wherein the monoalcohol radical of component (2) includes a member of a group consisting of aromatic, cycloaliphatic and heterocyclic radicals.

13. The mixture defined in claim 8 wherein component (1) is toluylene diisocyanate.

14. The mixture as defined in claim 8 wherein component (2) is allyl alcohol.

15. The mixture as defined in claim 1 wherein component (B) is styrene.

16. A glass fiber product comprising glass fibers bonded with a binder comprising the composition defined in claim 1.

References Cited

UNITED STATES PATENTS

| | | | |
|---|---|---|---|
| 2,915,493 | 12/1959 | Nischk et al. | 260—859 |
| 3,136,733 | 6/1964 | Ross et al. | 260—859 |
| 3,227,778 | 1/1966 | Delius | 260—859 |

FOREIGN PATENTS

| | | |
|---|---|---|
| 1,117,306 | 3/1962 | Germany. |
| 1,158,602 | 1/1958 | France. |
| 1,126,602 | 3/1962 | Germany. |

MURRAY TILLMAN, *Primary Examiner.*

SAMUEL H. BLECH, *Examiner.*

J. T. GOOLKASIAN, *Assistant Examiner.*